US005643627A

United States Patent [19]
Huang et al.

[11] Patent Number: 5,643,627
[45] Date of Patent: Jul. 1, 1997

[54] NON-GELLING WAXY STARCH HYDROLYZATES FOR USE IN FOODS

[75] Inventors: David P. Huang, Bound Brook; Roger Jeffcoat, Bridgewater; William R. Mason, Somerville, all of N.J.

[73] Assignee: National Starch and Chemical Investment Holding Corporation, Wilmington, Del.

[21] Appl. No.: 581,239

[22] Filed: Dec. 29, 1995

[51] Int. Cl.$^6$ .................................................. A23L 1/0522
[52] U.S. Cl. ........................... 426/578; 426/658; 426/804; 426/661
[58] Field of Search ...................... 426/573, 578, 426/579, 658, 603, 604, 613, 804, 661

[56] References Cited

U.S. PATENT DOCUMENTS

| | | | |
|---|---|---|---|
| 3,369,910 | 2/1968 | Ganz et al. | 99/139 |
| 3,525,672 | 8/1970 | Wurzburg et al. | 195/31 |
| 3,962,465 | 6/1976 | Richter et al. | 426/48 |
| 3,986,890 | 10/1976 | Richter et al. | 127/38 |
| 4,082,857 | 4/1978 | Croome | 426/573 |
| 4,428,972 | 1/1984 | Wurzburg et al. | 426/578 |
| 4,510,166 | 4/1985 | Lenchin et al. | 426/565 |
| 4,536,408 | 8/1985 | Morehouse et al. | 426/250 |
| 4,562,086 | 12/1985 | Smolka | 426/578 |
| 4,869,919 | 9/1989 | Lowery | 426/604 |
| 4,977,252 | 12/1990 | Chiu | 536/102 |
| 4,981,709 | 1/1991 | Furesik et al. | 426/565 |
| 5,110,612 | 5/1992 | Quarles et al. | 426/548 |
| 5,302,408 | 4/1994 | Cain et al. | 426/603 |

*Primary Examiner*—Jeanette Hunter
*Attorney, Agent, or Firm*—Eugene Zagarella, Jr.

[57] ABSTRACT

A non-gelling starch having good freeze-thaw stability and good mouthfeel making it suitable for use as a food additive is provided by selected waxy starch which has greater than 30% by weight of short chains with a DP of less than 13 and has been converted to a WF of from about 10 to 80, preferably 20 to 45. Particularly useful waxy starches are a hybrid waxy starch from a plant of wxsu2 genotype, waxy rice, waxy barley and amaranth.

20 Claims, No Drawings

NON-GELLING WAXY STARCH HYDROLYZATES FOR USE IN FOODS

BACKGROUND OF THE INVENTION

This invention relates to non-gelling, freeze-thaw stable starches for use in foods. More particularly, this invention involves selected, hydrolyzed waxy starches which provide good mouthfeel properties and are non-gelling, even at low temperatures, making them especially useful in food products.

In recent years, food manufacturers have worked to develop technology for reducing the lipid and caloric content of processed foods. The genesis of this technology is the growing consumer awareness of the nutritional value and caloric content of foods, and heightened consumer desire to reduce overall fat content of the diet, as well as to reduce or maintain body weight by selection of low-fat or low-calorie foods.

Because starch has a caloric content of only 4 Kcal/g and lipid has a caloric content of 9 Kcal/g, research efforts have been directed towards the use of starch as a lipid mimetic or fat replacer in foods. In order to meet the critical needs of the food industry and especially the various functional and property requirements that must be satisfied, native starches are often modified by numerous known techniques to change the behavioral characteristics yet still essentially retain the caloric value of the native (unmodified) starch.

Chemical treatment by crosslinking (inhibition) or by the introduction of substituent groups are the most common forms of modification used to stabilize and provide starch with the desired functional characteristics. Various chemical treatments and modifications of starch are disclosed in the following noted U.S. patents.

U.S. Pat. No. 4,981,709 issued Jan. 1, 1991 to Furcsik et al., discloses low or reduced fat foods that are prepared with hydroxypropyl ether derivatives of high amylose starch (at least 40% amylose) which are not crosslinked and have a degree of substitution of at least 0.04.

U.S. Pat. No. 4,977,252 issued Dec. 11, 1990 to C. Chiu involves a modified starch emulsifier useful in foods and other products comprising an enzyme degraded starch containing a hydrophobic group or both hydrophilic and hydrophobic substituent groups.

U.S. Pat. No. 4,562,086 issued Dec. 31, 1985 to Smolka et al., discloses a crosslinked, etherified common (non-waxy) starch particularly suited for use in a salad dressing.

U.S. Pat. No. 3,369,910 issued Feb. 20, 1968 to Ganz et al. discloses non-crosslinked, hydroxypropyl starch ether derivatives that are used to provide stable thickening effects in foods that are subjected to freeze/thaw cycles and other types of temperature cycling (e.g., cooking).

U.S. Pat. No. 5,110,612 issued May 5, 1992 to Quades et al. discloses specific hydrolyzate products of hydroxypropyl starch which have utility in replacing sucrose in low calorie food products.

U.S. Pat. No. 4,510,166 Issued Apr. 9, 1985 to Lenchin et al., involves the use of converted starches having a DE (dextrose equivalent) of less than 5 and a certain specified hot flow viscosity, as fat and oil replacements in gel forming foodstuffs.

U.S. Pat. No. 4,536,408 issued Aug. 20, 1985 to Morehouse et al., discloses a low fat, butter-like spread prepared with a non-gelling starch hydrolyzate having a DE of from 4 to 25.

U.S. Pat. Nos. 3,962,465 issued Jun. 8, 1976 and 3,986,890 issued Oct. 19, 1976 to Richter et al., disclose processes for preparing starch hydrolyzates by enzyme treatment. The low DE starch hydrolyzates are useful as additives in gel forming food products.

U.S. application Ser. No. 08/333,111 filed Nov. 1, 1994 discloses non-gelling starch derivatives such as hydroxypropyl starch ethers which are useful as fat replacers in reduced fat foods such as salad dressings, margarine and butter substitutes, low-fat spreads, puddings, sauces and gravies.

U.S. Pat. No. 4,428,972 issued Jan. 31, 1984 to Wurzburg et al., is directed to thickener starches useful in foodstuffs which comprise a hybrid waxy starch from a plant of wxsu2 genotype. These thickener starches provide good low temperature stability and have improved functional properties when modified by derivatization to form ethers or esters, or by crosslinking.

U.S. Pat. No. 3,525,672 issued Aug. 25, 1970 to Wurzburg et al. discloses the treatment of an inhibited or crosslinked starch with an enzyme such as beta-amylase to impart freeze-thaw stability.

Despite the various starch products and particularly the modified starches that have been developed for use in low or reduced fat foods, the food manufacturers still seek starch products having suitable oily and fatty mouthfeel and which do not gel at low temperature, especially those which are unmodified.

SUMMARY OF THE INVENTION

This invention provides a non-gelling selected waxy starch hydrolyzate characterized by good mouthfeel and freeze-thaw stability, making it suitable for use in foods as an additive, as for example, a mouthfeel enhancer, lipid mimetic or fat replacer.

More particularly, this invention involves a non-gelling starch suitable for use as an additive in foods, characterized in that the starch is a waxy starch which has greater than 30% by weight of short chains with a DP (degree of polymerization) of less than 13 and has been converted to a water fluidity (WF) of from about 10 to 80, preferably about 20 to 45.

DETAILED DESCRIPTION OF THE INVENTION

The starch suitable for use as an additive in foods in accordance with this invention must satisfy a number of functional and property requirements. Besides being non-gelling, it must be freeze-thaw stable and have good mouthfeel. Selected starches which are suitable for use herein are those having natural freeze-thaw stability and more particularly selected waxy starches having an amylopectin content of 90% or more by weight and preferably 95% or more. The selected waxy starches must have greater than 30% by weight of short chains with a DP (degree of polymerization) of less than 13. The useful starches also are converted or hydrolyzed by acid or enzyme conversion and also by oxidation to provide a fluidity or WF (water fluidity) number of about 10 to 80, preferably about 20 to 45, and more preferably about 25 to 40. The starch base materials useful in this invention also includes starch flours where the starch component of the flour has the same characteristics of the waxy starches described herein. Starches which have been found especially suitable include a hybrid waxy starch from a plant of wxsu2 genotype, waxy rice, waxy barley and amaranth.

A preferred starch for use in this invention is a hybrid waxy starch from a plant of wxsu2 genotype. This starch is extracted from maize grown from double-recessive mutants of the waxy sugary-2 genotype, designated for purposes herein as wxsu2. The waxy gene is located at position 59 of chromosome 9 of corn while the sugary-2 gene is located at position 57 of chromosome 6. (see M. G. Nueffer, L. Jones and M. Zuben, "The Mutants of Maize" (Crop Science Society of America, Madison, Wis., 1968) pp. 72 and 73)).

Also within the scope of this invention is the starch resulting from wxsu2 mutants wherein the wx and/or su2 genotype have been moved to another position of the plant genome by translocation, inversion, or any other methods of chromosome engineering. In addition, starch extracted from a plant grown from artificial mutations and variations of the above genetic compositions which may be produced by known standard methods of mutation breeding is also applicable herein. The designation of the mutant as wxsu2 genotype is intended to mean that the mutant will necessarily contain the wx and su2 genes but is not limited thereto.

To obtain the double-recessive mutant of the wxsu2 genotype in maize in a usual manner, one may, for example, cross a waxy mutant (wx) with a sugary-2 mutant (su2), and thereafter self pollinate the first generation single cross (Wx wx Su2 su2) to theoretically recover the double mutant in a 15:1 ratio from a segregating ear. The starch utilized in this invention may be obtained from inbred lines, but it is more desirable that the starch be obtained from hybrids derived from inbreds containing the wxsu2 double-recessive mutant, ordinarily because of higher yields and other factors. While maize is the preferred specific plant herein for the source of the hybrid waxy starch, the invention is also applicable to other plant species such as, for example, waxy rice, waxy barley and waxy sorghum, that are of a wxsu2 genotype.

In the preparation of the waxy starch hybrid, extraction of the starch from the kernel of the maize grown from the double-recessive mutant seed may be carried out in a standard manner by the wet-milling or dry-milling process well known in the art, but is not limited to such methods. In one typical wet-milling process, which is preferred herein but serves only as an example of suitable such processes, the corn is cleaned by strong currents of air, sifters and electromagnets to remove unwanted material. It is thereafter steeped in warm water containing a small amount of sulfur dioxide. The steep-water is drawn off and the softened kernels are run through attrition mills to tear them apart. The germ is removed and the remaining mixture is ground, washed and sieved as a slurry. The starch is separated from the gluten by centrifugation, and the remaining slurried starch is then filtered, washed, resuspended and refiltered.

Extraction of flour or variants thereof from the maize kernel is accomplished by a dry-milling process. In a typical such procedure which is suitable herein but not exclusive of other procedures, the corn is first thoroughly cleaned and passed through a scourer and is then tempered or conditioned and passed through a corn degerminator. Stock from the degerminator is dried and then cooled, passed through a hominy separator and aspirator, ground, and finally sifted according to whether whole or separate fractions are desired.

Starches of this wxsu2 type are further described in U.S. Pat. No. 4,428,972 issued Jan. 31, 1984 to O. Wurzburg et al., said patent is hereby incorporated by reference.

The selected waxy starches having the desired amount of short chains as indicated by degree of polymerization (DP), are converted to a suitable fluidity by conversion using either acid or enzyme treatment or by oxidative hydrolysis. In acid treatment, the starch base is hydrolyzed in the presence of an acid, such as sulfuric or hydrochloric acid, at a temperature below the gelatinization point of the starch. The starch is slurried in water, and the acid is then added. Typically, the reaction takes place over an 8 to 20 hour period, after which the acid is neutralized with alkali (e.g., to a pH of 5.5) and the starch recovered by filtration. The resulting converted starch requires cooking to gelatinize the starch.

Enzyme conversion involves treatment with alpha amylase ($\alpha$-1,4-glucan 4-glucanohydrolases) or other alpha-1,4-glucosidase. In the preparation of the converted starches by enzyme treatment, the starch base is slurried in water, and the pH is adjusted to about 5.6 to 5.7 with alkali or acid. A small amount of alpha amylase enzyme (e.g., about 0.02% on the starch) is added to the slurry, which is then heated above the gelatinization point of the starch. When the desired conversion has been achieved, the pH is adjusted to about 2.0 with acid to deactivate the enzyme and that pH is maintained for a period of at least 10 minutes. Thereafter the pH may be readjusted upward. The resulting starch dispersion is usually jet-cooked to ensure complete solubilization of the starch and deactivation of the residual enzyme.

Oxidative hydrolysis may also be used in the preparation of the converted starches. One such procedure involves a process employing hydrogen peroxide and a catalytic amount of manganese ions, such as potassium permanganate, in an alkaline slurry reaction. This process is further described in U.S. Pat. No. 4,838,944 issued Jun. 13, 1989 to L. Kruger, and said patent is hereby incorporated by reference.

The starches used in this invention are converted to a water fluidity (WF) of about 10 to 80, preferably about 20 to 45, and more preferably 25 to 40. The measurement for "water fluidity" (WF) as described herein is made using a Thomas Rotational Shear-Type Viscometer (manufactured by Arthur H. Thomas Co., Philadelphia, Pa.) in accordance with standard procedures such as disclosed in Zwiercan et al., U.S. Pat. No. 4,499,116 issued Feb. 12, 1985, which patent is incorporated by reference herein. A further detailed description of this measurement is presented later in the Testing Procedures section.

The waxy starches used in this invention have a selected chain length distribution such that greater than 30% by weight of the chains have a degree of polymerization (DP) of less than 13. The DP of the starch product is an indication of the average number of monomeric or anhydroglucose units in the molecule. This chain length distribution was determined using gel permeation chromatography (GPC) with a Water Associates GPC-150C instrument and by high performance anion exchange chromatography (HPAEC) with pulsed amperometric detection (Dionex Corp., Sunnyvale, Calif.). Details of these methods are provided in the Testing Procedures section.

The non-gelling starches of this invention have good low temperature, freeze-thaw stability properties and improved texture making them useful for enhanced flow or mouthfeel in foods, particularly those reduced in fat, sugar or other ingredients or as lipid or fat replacers and provide good mouthfeel making them useful in food products, particularly as a mouthfeel enhancer or a lipid or fat replacer. The non-gelling starches which may be added during manufacturing or processing of the foods are useful in a variety of foods including dressings, sauces, gravies, dairy products and beverages. More particularly, the starches of this invention are useful in processed foods such as spoonable and pourable salad dressings, sauces, gravies, dairy products such as yogurt, soft serve ice cream, frozen desserts, sour cream, cottage cheese dressings, milk drinks and whipped toppings, margarines and butter substitutes, baked goods, low-fat spreads, low-fat cheeses, beverages such as canned coffee, coffee creamers and soy milk, and confectionery cream fillings. Any liquid, flowable or spoonable food is a suitable matrix for inclusion of the non-gelling starch as an additive, lipid mimetic, or fat replacer. The food may also be in a solid form when consumed (e.g., baked goods are prepared in liquid or flowable forms and consumed in dry solid forms).

The amount of waxy starch hydrolyzates used in food products is not critical and will depend on the type food product and the degree of functional property or fat replacement desired. More particularly, the waxy starch hydrolyzate of this invention will be used in food products at an amount of 0.01 to 50% by weight, based on the weight of the food product, and preferably from about 0.1 to 10% by weight.

In a preferred embodiment, a lipid or fat containing food is formulated with the non-gelling starch of this invention in lieu of the lipid or fat, so as to provide from 0.01 to 100% by weight replacement and more preferably 25 to 100% replacement of the lipid that is traditionally contained in that food.

The following examples will more fully illustrate the embodiments of this invention. In these examples, all parts and percentages are given by weight, and all temperatures in degrees Celsius unless otherwise noted.

TESTING PROCEDURES

Water Fluidity Measurement

The water fluidity of the starches is measured using a Thomas Rotational Shear-Type Viscometer (manufactured by Arthur H. Thomas Co., Philadelphia, Pa. 19106), standardized at 30° C. with a standard oil having a viscosity of 24.73 cps, which oil requires 23.12±0.05 seconds for 100 revolutions. Accurate and reproducible measurements of the water fluidity are obtained by determining the time which elapses for 100 revolutions at different solids levels depending on the starch's degree of conversion (as conversion increases, the viscosity decreases). The procedure used involves slurrying the required amount of starch (e.g., 6.16 g. dry basis) in 100 ml of distilled water in a covered copper cup and heating the slurry in a boiling water bath for 30 minutes with occasional stirring. The starch dispersion is then brought to the final weight (e.g., 107 g) with distilled water. The time required for 100 revolutions of the resultant dispersion at 81° to 83° C. is recorded and converted to a water fluidity number as defined in the table below.

| Time Required for 100 Revolutions (seconds) Amount of Starch used (anhydrous, g): | | | | |
|---|---|---|---|---|
| $6.16^a$ | $8.80^b$ | $11.44^c$ | $13.20^d$ | Water Fluidity |
| 60.0 | | | | 5 |
| 39.6 | | | | 10 |
| 29.3 | | | | 15 |
| 22.6 | | | | 20 |
| 20.2 | | | | 25 |
| | 33.4 | | | 30 |
| | 27.4 | | | 35 |
| | 22.5 | | | 40 |
| | | 32.5 | | 45 |
| | | 26.8 | | 50 |
| | | 22.0 | | 55 |
| | | | 24.2 | 60 |

-continued

| Time Required for 100 Revolutions (seconds) Amount of Starch used (anhydrous, g): | | | | |
|---|---|---|---|---|
| $6.16^a$ | $8.80^b$ | $11.44^c$ | $13.20^d$ | Water Fluidity |
| | | | 19.2 | 65 |
| | | | 15.9 | 70 |
| | | | 13.5 | 75 |
| | | | 11.5 | 80 |
| | | | 10.0 | 85 |
| | | | 9.0 | 90 |

For a, b, c and d, final weights of starch solutions are 107, 110, 113 and 115 g, respectively.

Chain-Length Distribution (GPC)

Chain-length distribution was determined by gel permeation chromatography (GPC) using a Water Associates (Milford, Mass.) GPC-150C model with refractive index detector. Two PL gel columns ($10^5$ and $10^3$) made of highly crosslinked spherical polystyrene/divinylbenzene and obtained from Polymer Laboratories (Amherst, Mass.) were connected in sequence. The columns were calibrated using dextran standards obtained from Pharmacia Fine Chemicals (Piscataway, N.J.). Other conditions used were: column temperature 80° C.; flow rate 1 ml/min.; mobile phase dimethyl sulfoxide with 0.05 M $NaN^o{}_3$; sample concentration 0.1%; injection volume 150 µl. The weight distribution of the starches having selected degrees of polymerization (DP) was determined by calculation or integration from the resulting molecular weight distribution curves.

Chain-Length Distribution (HPAEC)

Chain-length distribution was determined by high performance anion exchange chromatography (HPAEC) with pulsed amperometric detection (Dionex Corp., Sunnyvale, Calif.). A Dionex Carbopac PA-100 column (4×250 mm) was used with a Carbopac PA Guard column (3×25 mm). The potential and time settings on PAD cell were $E_1$=0.10 ($+_1$=480); $E_2$=0.60 ($+_2$=120); $E_3$=0.80 V ($t_3$=300 ms).

The eluent A was 150 mM sodium hydroxide solution, which was prepared by dilution of carbonate-free 50% sodium hydroxide in deionized water. The eluent B was 150 mM sodium hydroxide solution, containing 500 mM sodium acetate. The gradient program used is shown in the table (Pump Gradient for Dionex) starting with 85% eluent A and 15% eluent B, ending with 100% eluent B. All separations were carried out at ambient temperatures with a flow rate of 1 ml/minute.

Note: This measurement is made for all chains having a DP of up to 60, i.e., the percentage area DP shown will be the percent based on the total area of all chains up to 60. Also, 6 DP is the shortest chain that is seen.

| Pump Gradient for Dionex | | |
|---|---|---|
| Time | % A | % B |
| 0.0 | 85 | 15 |
| 0.1 | 85 | 15 |
| 0.4 | 85 | 15 |
| 20.0 | 65 | 35 |
| 35.0 | 50 | 50 |
| 50.0 | 40 | 60 |
| 75.0 | 30 | 70 |
| 85.0 | 25 | 75 |
| 87.0 | 0 | 10 |

-continued

| Pump Gradient for Dionex | | |
|---|---|---|
| Time | % A | % B |
| 95.0 | 85 | 15 |
| 105.0 | 85 | 15 |

To prepare the samples, each starch sample (20 mg) was weighed into a 10 ml vial; 2 ml of 90% DMSO (dimethyl sulfoxide) (DMSO: water=9:1, volume/volume) was added, mixed with a magnetic string bar, and heated in a boiling water bath for 5 minutes. Then, 7 ml of water was added and mixed. After the mixture was cooled to room temperature, 1 ml of 150 mM sodium hydroxide was added, mixed and 1 ml of solution was run by the Dionex.

EXAMPLE 1

A hybrid waxy maize starch of wxsu2 genotype was analyzed for weight distribution of selected chain length distributions (i.e., DP$\leq$12, or $\leq$10) by gel permeation chromatography (GPC) using the Water Associates GPC-150C model and procedure described above. From the resulting molecular weight distribution curves, the weight distribution was determined by integration with the following results. The results as shown also include the weight distribution found for samples of waxy corn (Amioca) as well as waxy rice and amaranth.

| | % by Weight | |
|---|---|---|
| Starch | DP $\leq$ 10 | DP $\leq$ 12 |
| wxsu2 - A | 21.8 | 31.5 |
| wxsu2 - B | 23.5 | 33.4 |
| wxsu2 - C | 23.0 | 32.9 |
| waxy rice | 21.9 | 33.8 |
| amaranth | 22.8 | 33.4 |
| Amioca (waxy corn) | 18.6 | 29.1 |

A hybrid waxy maize starch of wxsu2 genotype was analyzed for chain-length distribution as determined by HPAEC (Dionex) and found to have 29.53% area of chains with a degree of polymerization of less than 13 (percent based on total of chains up to 60 DP). The chain length distribution is shown in the following table which also shows the distribution of similarly treated waxy corn (amioca), waxy rice and amaranth.

| STARCH | % AREA[1] DP | | | | | | | TOTAL (6 to 12) |
|---|---|---|---|---|---|---|---|---|
| | 6 | 7 | 8 | 9 | 10 | 11 | 12 | |
| wxsu2 | 1.28 | 2.65 | 4.10 | 4.89 | 5.41 | 5.71 | 5.49 | 29.53 |
| waxy rice | 0.93 | 1.86 | 3.95 | 5.17 | 6.14 | 6.61 | 6.60 | 30.76 |
| Amaranth | 0.82 | 1.72 | 3.54 | 5.66 | 7.04 | 7.57 | 6.97 | 33.32 |
| Amioca (waxy corn) | 0.63 | 0.83 | 1.07 | 2.67 | 4.39 | 5.24 | 5.78 | 20.61 |

[1]% of chains up to 60 DP

The percent area as noted above shows the relative proportion of chain distribution for the sample starches and can be converted to weight percent using a conversion factor which depends on the specific equipment used. The area results indicate that the specific starch materials of this invention have a significantly increased proportion of short chains of 6 to 12 DP as compared to the waxy corn starch.

The natural freeze-thaw stability of the following starches were shown using measurements made by different scanning calorimetry (DSC). During cooking, granular starch molecules separate and bind water. Retrogradation is the reassociation of previously hydrated starch polymers. Cooked starch pastes retrograde if held for extended periods at room temperature but at low temperature the process is accelerated. Retrograded starches are characterized by increased opacity, syneresis and changes in texture. The degree to which cooked starch has retrograded can be estimated by measuring the energy required to separate the retrograded chains (Donovan, John, 1979, "Phase Transition of the Starch Water System", Biopolymers 18:263–275). This is done with a differential scanning calorimeter (DSC), a device measuring the energy required to heat a sample at a uniform rate through the critical temperature range. Since the heat capacity of the starch does not change appreciably, the absorption or evolution of heat is attributable to phase changes, e.g., melting of retrograded starch. The endotherm (absorption of heat per the DSC) for the retrograded material (retrogradation) is compared to the energy originally required to cook (gelatinization) the sample. The ratio for the endotherm of the retrograded starch and the raw cooked starch expresses the percent retrogradation. The results are shown below.

| STARCH | $\Delta$H (Gelatinization) | $\Delta$H (Retrogradation) | % Retrogradation |
|---|---|---|---|
| wxsu2 | 3.06 | 0.82 | 26.89 |
| waxy rice | 3.65 | 1.25 | 34.25 |
| waxy corn | 4.46 | 2.84 | 63.68 |

Percent retrogradation is an indication of how freeze-thaw stable a starch is. The lower the percent retrogradation, the better freeze-thaw stable the starch. The data shows that the hydrolyzed wxsu2 starch as well as the waxy rice have significantly better freeze-thaw stability in comparison with the waxy corn sample.

EXAMPLE 2

A no-fat cup set yogurt was prepared using an acid converted wxsu2 waxy maize starch of this invention as a fat replacer. The converted starch was prepared by slurrying the waxy maize starch in water and adding 2% of sulfuric acid and holding at a temperature of 40° C. for 20 hours. The resulting converted starch had a water fluidity (WF) of 38.5. The non-fat yogurt having the following formulation was prepared:

| INGREDIENTS | SAMPLE STARCH | CONTROL |
|---|---|---|
| 1% fat milk | 87.0 | 87.0 |
| Nonfat dry milk | 4.0 | 4.0 |
| Plain yogurt | 4.0 | 4.0 |
| Sugar | 3.0 | 3.0 |
| 10 DE Maltodextrin | — | 2.0 |
| wxsu2 starch (WF 38.5) | 2.0 | — |

Preparation:
1. Dry mix all ingredients together

2. Blend dry ingredients with the milk in Waring Blender at low speed (avoid foaming)
3. Bath pasteurize at 180° F. and hold for 10 minutes
4. Homogenize at 1500 psi using two-stage Gaulin Homogenizer
5. Cool mixture to 120° F.
6. Add yogurt starter (contains active culture) and incubate at 113° F. until pH is 4.1 to 4.3
7. Refrigerate after incubation Based on visual and sensory analysis, the converted wxsu2 starch functions effectively as a fat replacer. The yogurt containing wxsu2 starch had increased mouthfeel, smooth and creamy texture and homogeneous stir-down. When compared to the control the wxsu2 starch was significantly better. The control was mouth-drying chunky when stirred and had severe serum separation.

EXAMPLE 3

A non-fat soft serve ice cream containing the converted wxsu2 starch as prepared in Example 2 as a fat replacer was prepared and evaluated.

The ice cream having the following formulation was prepared.

| INGREDIENTS | STARCH SAMPLE | CONTROL |
| --- | --- | --- |
| Skim milk | 74.75 | 75.25 |
| Sugar | 10.00 | 10.00 |
| 36 DE Corn Syrup | 6.00 | 6.00 |
| Nonfat Dry Milk | 5.95 | 5.95 |
| 10 DE Maltodextrin | — | 2.00 |
| wxsu2 starch | 2.50 | — |
| Stabilizer | 0.80 | 0.80 |

Preparation:
1. Blend stabilizer with milk
2. Dry blend sugar, nonfat dry milk and starch and blend with milk in Breddo Likwifier for 5 minutes
3. Batch pasteurize in steam jacketed kettle at 165° F. for 30 minutes
4. Homogenize at 2500 psi using two-stage Gaulin Homogenizer
5. Cool mix to 40° F. and age overnight
6. Freeze in soft serve ice cream freezer.

Based on visual and sensory analysis, the converted wxsu2 starch functions efficiently as a fat replacer in this product. The test sample was heavy bodied, smooth and slippery in mouthfeel and easy to process. The control sample had quick melt-away, no mouthfeel and weak body. Overall the ice cream made with the converted wxsu2 starch was significantly better than the maltodextrin containing product.

EXAMPLE 4

A fat-free spoonable dressing was made using an acid converted waxy maize starch of wxsu2 genotype (WF 36). The dressing having the following formulation was prepared.

| Ingredients | Percent |
| --- | --- |
| A. Water | 72.02 |
| Microcrystalline cellulose | 0.30 |
| B. Xanthan gum | 1.50 |
| Titanium dioxide | 0.30 |
| Sodium benzoate | 0.01 |
| C. White vinegar | 6.00 |
| D. Thermflo (starch thickener) | 6.00 |
| Sucrose | 5.00 |
| 10 DE Maltodextrin | 5.00 |
| wxsu2 waxy maize starch (WF 36) | 2.00 |
| Sodium chloride | 1.70 |
| Mustard powder | 0.30 |
| Onion powder | 0.10 |
| Garlic powder | 0.10 |
| Potassium sorbate | 0.01 |
| EDTA (ethylenediaminetetraacetic acid) | 0.01 |
| Total | 100.00 |

Preparation:
1. Mix water and microcrystalline cellulose for 10 minutes with high shear
2. Add B, mix 5 minutes with high shear
3. Add vinegar
4. Blend D, add to above and mix at moderate speed until uniform
5. Heat to 95° C. and hold 10 minutes
6. Cool to 40° C.
7. Colloid mill and pack Based on mouthfeel, a test panel found the sample containing the starch mouthfeel enhance of this invention as described above, to be more rich and creamy like a full fat product, than a control sample which did not contain the starch product.

EXAMPLE 5

A lite pancake syrup containing half the solids (38%) and less calories than regular syrup was prepared using a starch hydrolyzate which was an acid converted waxy maize starch of wxsu2 genotype (WF 10). The syrup having the following formulation was prepared.

| Ingredients | Percent |
| --- | --- |
| Water | 57.88 |
| 15 DE Maltodextrin | 33.44 |
| wxsu2 waxy maize starch (WF 10) | 5.00 |
| Maple syrup | 3.00 |
| Maple flavor | 0.45 |
| Citric acid | 0.05 |
| Sodium benzoate | 0.05 |
| Potassium sorbate | 0.05 |
| Aspartame | 0.05 |
| Caramel color | 0.03 |
| Total | 100.00 |

Preparation:
1. Disperse wxsu2 starch in maple syrup and water
2. Heat slurry to 90° C. and hold for 10 minutes
3. Add caramel previously diluted with some of the water in formulation
4. Add remaining ingredients and hold for 2 minutes at 90° C.
5. Hot fill glass bottles with syrup and cap The resulting product was stable in both viscosity and appearance and had good flow properties. This compared favorably with a similar product which used waxy maize (i.e., not the converted wxsu2 genotype) which was not stable and had poor flow properties.

EXAMPLE 6

Several samples of the waxy maize wxsu2 genotype converted to different water fluidities (WF) were formulated into spoonable dressing as in Example 4. Viscosities of the samples (Brookfield using DVII viscometer at room temperature) were determined at different time intervals and compared with samples of waxy maize and the waxy maize wxsu2 genotype that was not converted.

| | | Viscosity (CP) | |
|---|---|---|---|
| Sample | Initial | 1 Week | 2 Weeks |
| 1. wxsu2 waxy maize (WF 27) | 63,250 | 93,250 | 112,000 |
| 2. wxsu2 waxy maize (WF 36) | 67,000 | 75,750 | 87,000 |
| 3. wxsu2 waxy maize (WF 42) | 52,750 | 55,500 | 59,500 |
| 4. wxsu2 waxy maize (WF 48) | 44,500 | 57,750 | 57,000 |
| 5. waxy maize (WF 30) | 53,250 | 113,250 | 171,750 |
| 6. waxy maize (WF 46) | 40,000 | 108,000 | 166,250 |
| 7. waxy maize | 71,250 | 123,750 | 149,250 |
| 8. Control w commercial mouth feel enhancer | 36,750 | 45,000 | 48,500 |

The samples of the wxsu2 genotype, particularly the WF 36, 42 and 48 compared similarly in viscosity to the control sample whereas the waxy maize starch samples, both converted and unconverted exhibited a significant viscosity change over time and did not compare favorably with the wxsu2 starches of this invention or the control commercial product.

What is claimed is:

1. A non-gelling starch hydrolyzate suitable for use as a food additive characterized in that the base starch is a waxy starch or flour which has natural freeze-thaw stability and has greater than 30% by weight of short chain with a degree of polymerization (DP) of less than 13, and is converted to a water fluidity (WF) of from about 10 to 80.

2. The starch of claim 1 wherein the starch or flour is converted by acid hydrolysis, enzyme treatment or oxidative hydrolysis to a WF of from about 20 to 45.

3. The starch of claim 1 wherein base starch is a waxy starch selected from the group consisting of a hybrid waxy starch from a plant of wxsu2 genotype, waxy rice, waxy barley and amaranth.

4. The starch of claim 3 which has a WF of from about 20 to 45.

5. The starch of claim 2 wherein the starch is a waxy starch which is a hybrid waxy starch from a plant of wxsu2 genotype.

6. The starch of claim 5 wherein the waxy starch is a hybrid waxy maize starch from a plant of wxsu2 genotype.

7. The starch of claim 6 wherein the waxy starch has a WF of from about 25 to 40.

8. A non-gelling starch hydrolyzate suitable for use as a food additive characterized in that the starch is a starch having natural freeze-thaw stability and is selected from the group consisting of a hybrid waxy starch from a plant of wxsu2 genotype, waxy rice, waxy barley and amaranth and is converted to a water fluidity (WF) of from about 10 to 80.

9. The starch of claim 8 which is converted by acid hydrolysis, enzyme treatment or oxidative hydrolysis to a WF of from about 20 to 45.

10. A starch containing food product having good freeze-thaw stability and good mouthfeel comprising the addition of an effective amount of a non-gelling starch hydrolyzate which is a waxy starch which has natural freeze-thaw stability and has greater than 30% by weight of short chains with a degree of polymerization (DP) of less than 13, and is converted to a water fluidity (WF) of from about 10 to 80.

11. The food product of claim 10 wherein from about 0.01 to 50% by weight of the waxy starch is used, based on the weight of the food product.

12. The food product of claim 11 wherein the waxy starch is selected from the group consisting of a hybrid waxy starch from a plant of wxsu2 genotype, waxy rice, waxy barley and amaranth.

13. The food product of claim 12 wherein the waxy starch has a WF of from about 20 to 45.

14. The food product of claim 10 wherein the food is a liquid, a flowable or a spoonable food.

15. The food product of claim 12 wherein the food is a spoonable or pourable salad dressing, sauce, gravy, dairy product or beverage.

16. An improved lipid containing food wherein the improvement comprises the replacement of at least part of the lipid with an effective amount of the non-gelling starch hydrolyzate of claim 1.

17. The lipid containing food of claim 16 wherein the waxy starch is selected from the group consisting of a hybrid waxy starch from a plant of wxsu2 genotype, waxy rice, waxy barley and amaranth.

18. The lipid containing food of claim 17 wherein the waxy starch has a WF of from about 20 to 45.

19. The lipid containing food of claim 18 wherein the starch is converted by acid hydrolysis or enzyme treatment.

20. The lipid containing food of claim 17 wherein the food is a liquid, a flowable or a spoonable food.

* * * * *